United States Patent
Rebinger et al.

(10) Patent No.: US 12,291,081 B2
(45) Date of Patent: May 6, 2025

(54) METHOD AND SYSTEM FOR OPERATING A REFRIGERATION SYSTEM WITH A HEAT PUMP FUNCTION AND A REGENERATION FUNCTION FOR HEAT SOURCES AND A MOTOR VEHICLE INCLUDING SUCH A SYSTEM

(71) Applicant: AUDI AG, Ingolstadt (DE)

(72) Inventors: Christian Rebinger, Munich (DE); Dirk Schroeder, Manching (DE); Helmut Rottenkolber, Mindelstetten (DE)

(73) Assignee: Audi AG, Ingolstadt (DE)

( * ) Notice: Subject to any disclaimer, the term of this patent is extended or adjusted under 35 U.S.C. 154(b) by 126 days.

(21) Appl. No.: 18/042,825

(22) PCT Filed: Oct. 19, 2021

(86) PCT No.: PCT/EP2021/078959
§ 371 (c)(1),
(2) Date: Feb. 24, 2023

(87) PCT Pub. No.: WO2022/084322
PCT Pub. Date: Apr. 28, 2022

(65) Prior Publication Data
US 2023/0294481 A1    Sep. 21, 2023

(30) Foreign Application Priority Data

Oct. 20, 2020   (DE) .......................... 102020127528.5

(51) Int. Cl.
*B60H 1/22* (2006.01)
*B60H 1/00* (2006.01)
*B60H 1/32* (2006.01)

(52) U.S. Cl.
CPC ....... *B60H 1/2221* (2013.01); *B60H 1/00271* (2013.01); *B60H 1/32* (2013.01);
(Continued)

(58) Field of Classification Search
CPC .... B60H 1/2221; B60H 1/00271; B60H 1/32; B60H 2001/00307; B60H 2001/00949;
(Continued)

(56) References Cited

U.S. PATENT DOCUMENTS 4,209,996 A * 7/1980 Shaw .................. F24D 11/0264
                                                      62/196.4
6,862,892 B1 * 3/2005 Meyer ................ B60H 1/00892
                                                      62/238.7
(Continued)

FOREIGN PATENT DOCUMENTS

| DE | 102019203292 B4 * | 4/2021 | ......... B60H 1/00921 |
| DE | 102020117701 A1 * | 1/2022 | ......... B60H 1/00278 |
| KR | 20220127295 A *   | 9/2022 | |

OTHER PUBLICATIONS

Noraldeas: Your AC Solution Starts Here, "Air Source Heat Pump vs Water Source Heat Pump: The Ultimate Showdown for Heating Systems", Sep. 29, 2024. [online], [retrieved on Feb. 15, 2025]. Retrieved from the Internet: <URL: https://noraideas.com/air-source-heat-pump-vs-water-source-heat-pump/>. (Year: 2024).*

*Primary Examiner* — Ljiljana V. Ciric
(74) *Attorney, Agent, or Firm* — Maier & Maier, PLLC

(57) ABSTRACT

A method for operating a refrigeration system having a heat pump function for motor vehicle, including the following steps: setting a heat pump operation, in which the refrigerant is routed from the refrigerant compressor into the secondary line; setting an expansion valve assigned to the third heat exchanger such that a total mass flow of refrigerant flows through the third heat exchanger; and detecting the temperature of the coolant in the third heat exchanger. The total mass flow of refrigerant is routed through the third heat exchanger when the temperature of the coolant is greater than an upper limiting temperature.

13 Claims, 4 Drawing Sheets

(52) U.S. Cl.
CPC .............. *B60H 2001/00307* (2013.01); *B60H 2001/00949* (2013.01); *B60H 2001/00957* (2013.01); *B60H 2001/3263* (2013.01)

(58) Field of Classification Search
CPC .. B60H 2001/00957; B60H 2001/3263; B60H 2001/3255; B60H 1/00278; B60H 1/00907; B60H 2001/00928; B60H 2001/3266; B60H 2001/3285; F25B 5/02; F25B 25/005; F25B 40/00; F25B 41/20; F25B 2339/047; F25B 2700/21152; F25B 6/02; F25B 2400/0403; F25B 2600/2501
See application file for complete search history.

(56) References Cited

U.S. PATENT DOCUMENTS

| | | | |
|---|---|---|---|
| 8,291,719 B2* | 10/2012 | Cowans | F25B 40/00 62/513 |
| 9,410,752 B2* | 8/2016 | Wallace | F24F 11/77 |
| 10,072,863 B2* | 9/2018 | Wallace | G05D 7/0617 |
| 10,330,336 B2* | 6/2019 | Wallace | F24F 11/77 |
| 10,907,848 B2* | 2/2021 | Wallace | F24F 11/89 |
| 11,279,205 B2* | 3/2022 | Schroeder | B60H 1/00885 |
| 11,287,152 B2* | 3/2022 | Wallace | F24F 11/83 |
| 11,433,735 B2* | 9/2022 | Allgaeuer | B60H 1/00385 |
| 11,644,214 B2* | 5/2023 | Wallace | F24D 19/1009 700/278 |
| 11,796,210 B2* | 10/2023 | Wallace | F24H 15/38 |
| 12,188,676 B2* | 1/2025 | Wallace | F28F 27/00 |
| 2005/0039878 A1* | 2/2005 | Meyer | F25B 29/003 62/324.1 |
| 2017/0211829 A1* | 7/2017 | Slack | F24F 11/84 |
| 2017/0211862 A1* | 7/2017 | Slack | F24H 15/414 |
| 2019/0351740 A1* | 11/2019 | Filipkowski | B60H 1/32284 |
| 2023/0063915 A1* | 3/2023 | Kim | B60H 1/00921 |
| 2023/0294481 A1* | 9/2023 | Rebinger | F25B 6/02 62/239 |
| 2023/0296243 A1* | 9/2023 | Bandhauer | F01K 19/04 60/653 |
| 2024/0131901 A1* | 4/2024 | Schroeder | F25B 41/39 |

* cited by examiner

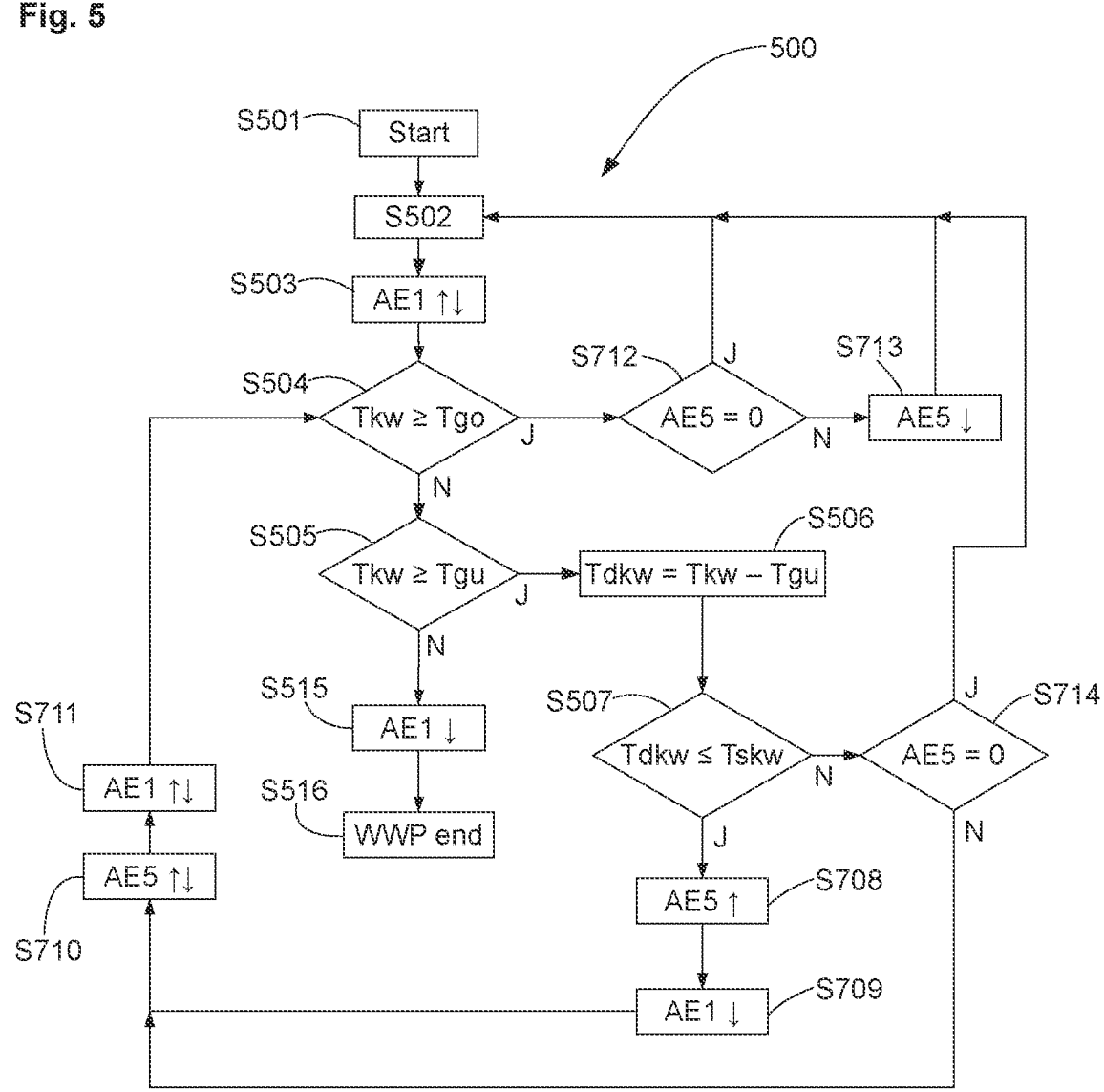

METHOD AND SYSTEM FOR OPERATING A REFRIGERATION SYSTEM WITH A HEAT PUMP FUNCTION AND A REGENERATION FUNCTION FOR HEAT SOURCES AND A MOTOR VEHICLE INCLUDING SUCH A SYSTEM

FIELD

The invention relates to a method for operating a refrigeration system having a heat pump function for a motor vehicle, a refrigeration system, and a motor vehicle having such a refrigeration system.

BACKGROUND

A refrigeration system having a heat pump function typically comprises a refrigerant compressor which is connectable or connected to a primary line and a secondary line; a directly or indirectly acting external heat exchanger, which is arranged in the primary line; an evaporator, which is arranged in the primary line; at least one further heat exchanger acting as a heat source, in particular a heating register, which is arranged in the secondary line; a primary line valve arranged between the refrigerant compressor and the external heat exchanger; a secondary line valve arranged between the refrigerant compressor and the at least one further heat exchanger, in particular the heating register.

Such a refrigeration system having a heat pump function for a motor vehicle is known, for example, from DE 10 2019 203 295 A1 or from US 2014/075966 A1. In this refrigeration system, different heat sources are switched over or used depending on a limiting temperature of the heat sources. Other refrigeration systems with multiple heat pumps are known, for example, from DE 10 2017 204 116 A1 and WO 2019/158316 A1. Reference is also made to documents DE 10 2013 206 630 A1, DE 10 2011 010 807 A1, and DE 10 2013 111 454 A1

In the method considered here, the focus is on the heat pump operation of the refrigeration system, i.e., an operating state in which, in particular, heating and/or, in individual cases, dehumidification of interior supply air takes place.

When such a refrigeration system for a motor vehicle has a high heat output requirement, especially in the case of a cold start, the heat source cools the coolant very quickly, for example, i.e., the amount of heat extracted from the coolant is greater than the amount of heat supplied to the coolant, for example in the form of waste heat from electrical storage devices or consumers. The refrigerant of the refrigeration system then extracts the absorbed waste heat from the coolant, which results in a lower performance or heating output of the heat pump. In particular, it is also to be considered that high-efficiency electrical components, which are cooled by coolants such as cooling water (water-glycol mixture), possibly do not provide sufficient (waste) heat supply to the coolant, so that its temperature is sufficient for efficient and, in particular, high-performance operation.

SUMMARY

The object on which the invention is based is considered that of specifying a method in which excessive cooling of a heat source, in particular a cooling medium that is used for evaporating refrigerant, is avoided. As a result, the overall energy consumption is to be optimized and, in particular, the consumption of electrical energy is also to be improved.

A method for operating a refrigeration system having a heat pump function for a motor vehicle is also proposed, wherein the refrigeration system comprises:

a refrigerant compressor which is connectable or connected to a primary line and a secondary line; a directly or indirectly acting external heat exchanger, which is arranged in the primary line; an evaporator, which is arranged in the primary line; at least one further heat exchanger representing as a heat source, in particular a heating register, which is arranged in the secondary line; a primary line valve arranged between the refrigerant compressor and the external heat exchanger; a secondary line valve arranged between the refrigerant compressor and the at least one further heat exchanger representing a heat source, in particular the heating register, a directly or indirectly acting third heat exchanger, in particular a chiller, operating as a water heat pump. It is provided that the method comprises the following steps:

setting a heat pump operation, in which the refrigerant is routed from the refrigerant compressor into the secondary line;

adjusting an expansion valve assigned to the third heat exchanger, in particular a chiller, such that a total mass flow of refrigerant flows through the third heat exchanger and is evaporated in the third heat exchanger by waste heat from coolant circulating in the third heat exchanger; detecting the temperature of the coolant in or at the third heat exchanger;

wherein the total mass flow of refrigerant is routed through the third heat exchanger when the temperature of the coolant is greater than an upper limiting temperature.

By monitoring the coolant temperature, it can be ensured that the total refrigerant mass flow is only routed via the third heat exchanger if the coolant also has sufficient potential to emit heat and to evaporate the refrigerant. Furthermore, this can ensure that the coolant is not cooled so much by the heat extraction in the third heat exchanger that it cannot be sufficiently heated again in its coolant circuit by the waste heat from, for example, electrical components of the motor vehicle.

Another reason not to cool the coolant too much is that as the coolant temperature decreases, the viscosity of the coolant increases and the coolant volume flow can collapse as a result. As a result, required or necessary minimum volume flows can no longer be ensured.

In the method, an expansion valve assigned to the external heat exchanger can be set in such a way that a partial mass flow flows through the external heat exchanger operating as an air heat pump, wherein at the same time the expansion valve assigned to the third heat exchanger is set in such a way that a partial mass flow of refrigerant continues to flow through the third heat exchanger. By switching on a further heat source (ambient air) for evaporating refrigerant in the external heat exchanger, a temperature drop in the coolant can be mitigated or stopped. Furthermore, a recovery of the temperature level of the coolant can also be achieved by such a measure. This makes it possible to make the heating output balance of the total system equalized. Furthermore, it can be ensured that a heating output provided by the heating register for the interior (cabin) of the motor vehicle does not drop noticeably.

In the method, the expansion valve assigned to the external heat exchanger can be at least partially opened as a function of a difference between the temperature of the coolant in the third heat exchanger, in particular the chiller, and a lower limiting temperature, in particular if the difference is 2K or less. This ensures that the external heat exchanger is switched on in good time to prevent the coolant from cooling down excessively as a result of heat transfer to the refrigerant.

A partial mass flow of refrigerant can continue to flow through the external heat exchanger until the coolant temperature has reached the upper limiting temperature or is greater than this. In other words, the external heat exchanger can remain switched on until the temperature level of the coolant is so high that excessive cooling of the coolant due to heat emission to the refrigerant no longer occurs, at least for a certain period of time.

In the method, the upper limiting temperature and the lower limiting temperature can be selected as a function of a detected ambient temperature. This ensures that at different ambient temperatures, for example from −5° C. to 15° C., suitable limiting temperatures are selected and set in order to be able to carry out the described method using the third heat exchanger (water heat pump) and possibly the external heat exchanger as an air heat pump.

Alternatively or additionally, the upper limiting temperature and the lower limiting temperature can be selected as a function of a detected relative humidity of the environment.

As a further alternative, the coolant limiting temperature can be set, which just ensures a minimum permissible throughput and thus volume flow of coolant.

In the method, the upper limiting temperature and the lower limiting temperature can be selected as a function of a possible temperature difference between the ambient temperature and the refrigerant temperature in the external heat exchanger during operation of the refrigeration system. The expansion valve assigned to the external heat exchanger can be set in such a way that the refrigerant temperature at the entry into the external heat exchanger is less than or at most equal to the ambient temperature, but in particular is 1 to 5 K less than the ambient temperature.

In the method, the expansion valve assigned to the external heat exchanger can be closed as a function of the difference between the temperature of the coolant in the third heat exchanger, in particular the chiller, and the lower limiting temperature, in particular if the difference is greater than 5 K. In other words, the air heat pump can be switched off again and the total mass flow of refrigerant can only be conducted via the third heat exchanger again when the temperature of the coolant has sufficiently moved away from the lower limiting temperature.

In the method, at least one electrical heating element can be activated alternatively or additionally, as a function of a difference between the temperature of the coolant in the third heat exchanger, in particular the chiller, and a lower limiting temperature, in particular if the difference is 2K or less, in order to supply heat to the refrigerant upstream or downstream of the third heat exchanger.

The electric heating element can be deactivated as a function of the difference between the temperature of the coolant in the third heat exchanger, in particular the chiller, and the lower limiting temperature, in particular if the difference is greater than 5K.

Alternatively, it is conceivable via a (temporary) reduction in the efficiency of the electric drive, but in particular for the period of the prevailing critical coolant temperatures, to provide additional heating capacity for the cooling fluid flow via this by heat loss and thus to assist the heating operation and maintaining and/or increasing the interior comfort.

In the method, alternatively or additionally, as a function of a difference between the temperature of the coolant in the third heat exchanger, in particular the chiller, and a lower limiting temperature, in particular if the difference is 2K or less, at least a partial mass flow of refrigerant downstream of the further heat exchanger, in particular the heating register, can be routed to the low-pressure side while bypassing the third heat exchanger and/or the external heat exchanger.

The bypassing of the third heat exchanger and/or the external heat exchanger for the rerouted mass flow of refrigerant can be ended as a function of the difference between the temperature of the coolant in the third heat exchanger, in particular the chiller, and the lower limiting temperature, in particular if the difference is greater than 5 K.

A refrigeration system having a heat pump function for a motor vehicle is also proposed, wherein the refrigeration system comprises:

a refrigerant compressor which is connectable or connected to a primary line and a secondary line; a directly or indirectly acting external heat exchanger, which is arranged in the primary line; an evaporator, which is arranged in the primary line; at least one further heat exchanger representing as a heat source, in particular a heating register, which is arranged in the secondary line; a primary line valve arranged between the refrigerant compressor and the external heat exchanger; a secondary line valve arranged between the refrigerant compressor and the at least one further heat exchanger representing a heat source, in particular the heating register, a directly or indirectly acting third heat exchanger, in particular a chiller, operating as a water heat pump. It is provided that the refrigeration system has at least one temperature sensor, which is configured to detect the coolant temperature in or on the inlet side at the third heat exchanger, in particular the chiller, and that the refrigeration system is configured to set the expansion valve assigned to the third heat exchanger and an expansion valve assigned to the external heat exchanger as a function of the detected coolant temperature.

Alternatively, the at least one sensor on the cooling circuit side can be arranged on the outlet side of the chiller, since in this way—after heat has been transferred from coolant to refrigerant—the coldest coolant temperature in the circulating fluid flow is detected. As a result, intervention in the system function by the control side can or will be made possible even earlier.

The setting of the expansion valves not only comprises (partially) open positions, but also a closed position, by which the refrigerant flow into the third heat exchanger or the external heat exchanger is prevented.

In particular, it is to be noted that the closed position to the external heat exchanger can also be implemented by a shut-off valve or by a check valve that is technically even simpler to implement, if the system is not designed in such a way that it uses the external heat exchanger as an air heat pump evaporator or does not wish to represent a heat pump function in the known embodiment.

The refrigeration system can have at least one bypass section branching off downstream of the further heat exchanger, in particular the heating register, which discharges on the low-pressure side upstream of the refrigerant compressor and forms a bypass of the third heat exchanger and the external heat exchanger.

A bypass expansion element, advantageously embodied as a bypass expansion valve, can be arranged in the bypass section.

Furthermore, the bypass section can discharge upstream of a refrigerant collector on the low-pressure side.

Such a bypass section has the advantage in particular that a kind of "short" triangular process is made possible, wherein refrigerant is routed downstream of the heating register essentially directly to the refrigerant compressor without potential or only slight heat losses, because a short flow path for the refrigerant is configured by means of the bypass section.

Alternatively or additionally, the refrigeration system can include at least one electric heating element, which is assigned to the refrigerant circuit and is configured to heat the refrigerant as required. One or more such heating elements can increase the temperature level of the refrigerant, in particular if the coolant fluid in the chiller cannot emit sufficient heat to the refrigerant and thus the water heat pump function cannot be used or cannot be used optimally or if it cannot or should not be operated due to the thermal balance at other components incorporated in the coolant circuit.

In addition to the heating element integrated in the refrigerant circuit, a heating element provided on the air side can also be avoided or it can be used to cover the (temporary) heating deficit until the water heat pump operation can resume its unrestricted operation.

If a heat exchanger subjected to coolant is provided on the air side downstream of the evaporator instead of a heating register or in addition thereto, an electric heater can also be provided in the coolant fluid circuit that supplies it.

The refrigeration system can comprise a control unit configured to carry out the above-described method.

A motor vehicle, in particular an at least partially electrically operated motor vehicle, can include an above-described refrigeration system. In an electric vehicle, the efficient operation of the refrigeration system can result in power savings, in particular even in heating operation for the interior or the cabin, so that a greater range of the electric vehicle can be achieved as a result.

The method presented here and the refrigeration system thus make it possible to prevent the excessive cooling of coolant (as a heat source for the refrigerant or the refrigerant circuit), in particular by alternating switching on or connection of at least two heat exchangers working as evaporators, wherein water and/or air are used as heat sources. As a result, the heating output balance can be equalized and the heating output for the interior or the cabin can be stabilized. In other words, a type of regeneration can be made possible for the coolant heat source, in which on the one hand the heat source is not (excessively) cooled further and in which further heating of the coolant is enabled.

Alternatively to the alternating switching on or connection of at least two heat exchangers working as evaporators, the complete and 100% changeover from one evaporator to the second can take place and thus a respective partial operation can be bypassed. For example, the system changes from complete water heat pump operation to full air heat pump operation and vice versa.

BRIEF DESCRIPTION OF THE FIGURES

Further advantages and details of the invention result from the following description of embodiments with reference to the figures. In the figures:

FIG. 5 shows a flow chart of an exemplary implementation of the method, in particular by means of the refrigeration system described in FIG. 1.

DETAILED DESCRIPTION

Figure 1:
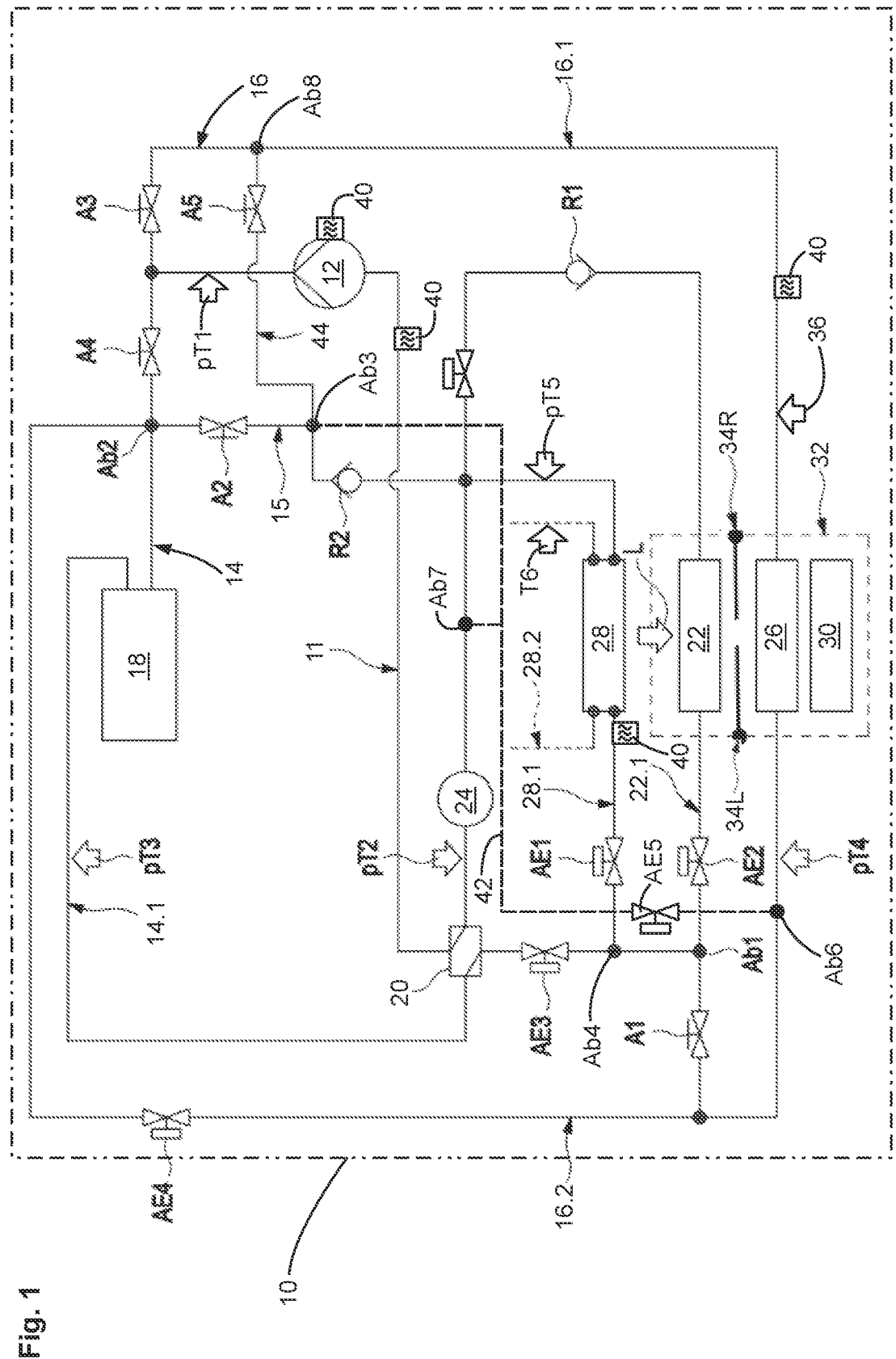
FIG. 1 shows a schematic and simplified circuit diagram of a refrigeration system for a motor vehicle.

FIG. 1 shows an embodiment of a refrigeration system 10 for a motor vehicle in a schematic and simplified manner. The refrigeration system 10 comprises a refrigerant circuit 11, which can be operated both in a refrigeration system operation (also called AC operation for short) and in a heat pump mode. In the embodiment shown, the refrigeration system 10 comprises a refrigerant compressor 12, an external heat exchanger 18, an internal heat exchanger 20, an evaporator 22 and an accumulator or refrigerant collector 24. The external heat exchanger 18 can be designed as a condenser or gas cooler. In particular, the external heat exchanger 18 can have flow through it bidirectionally in the illustrated embodiment.

The evaporator 22 is shown here by way of example as a front evaporator for a vehicle. The evaporator 22 is also representative of other evaporators possible in a vehicle, for example rear evaporators, which can be arranged fluidically in parallel to one another. In other words, the refrigeration system 10 comprises at least one evaporator 22.

A shut-off valve A4 is arranged downstream of the compressor 12. An expansion valve AE2 is provided upstream of the evaporator 22.

In the scope of this description, the section from the compressor 12 to the external heat exchanger 18, to the inner heat exchanger 20, and to the evaporator 22 is referred to as the primary line 14 in the entire refrigerant circuit 11 of the refrigeration system 10.

The refrigeration system 10 furthermore comprises a heating register 26 (also referred to as a heating condenser or heating gas cooler). A shut-off valve A3 is arranged upstream of the heating register 26. A shut-off valve A1 is arranged downstream of the heating register 26. Furthermore, an expansion valve AE4 is arranged downstream of the heating register 26.

In the scope of this description, the section from the compressor 12 to the heating register 26, to the expansion valve AE4, and to a branch Ab2 is referred to as the secondary line 16 in the entire refrigerant circuit of the refrigeration system 10. The secondary line 16 comprises a heating branch 16.1, which extends from the shut-off valve A3 via the heating register 26 to the shut-off valve A1. The secondary line 16 furthermore comprises a reheating branch or reheat branch 16.2, which is fluidically connectable to the heating register 26 upstream and to the external heat exchanger 18 downstream. The secondary line 16 or the reheat branch 16.2 discharges into the primary line 14 at a branching point Ab2.

The refrigeration system 10 comprises a further evaporator or chiller 28. The chiller 28 is provided fluidically in parallel to the evaporator 22. The chiller 28 can be used, for example, to cool an electrical component of the vehicle, but also to implement a water heat pump function using the waste heat from at least one electrical component. An expansion valve AE1 is connected upstream of the chiller 28.

The refrigeration system 10 can also include an electrical heating element 30, which is designed, for example, as a high-voltage PTC heating element. The electric heating element 30 is used as an auxiliary heater for a supply air flow L guided into the vehicle interior. The electric heating element 30 can be accommodated in an air-conditioning unit 32 together with the heating register 26 and the evaporator 22. In this case, the electrical heating element 30 can be arranged downstream of the heating register 26.

Check valves R1 and R2 are also apparent in FIG. 1. Furthermore, several sensors pT1 to pT5 for detecting pressure and/or temperature of the refrigerant are also shown. It is to be noted that the number of sensors and their arrangement is only shown here as an example. A refrigeration system 10 can also include fewer or more sensors. In the example shown, combined pressure/temperature sensors pT1 to pT5 are shown as the sensors. However, it is just as conceivable that sensors that are separate from one another are used for measuring pressure or temperature and, if necessary, are also arranged spatially separately from one another along the refrigerant lines.

The refrigeration system 10 can be operated in different modes, which are briefly described below.

In AC operation of the refrigerant circuit 11, the refrigerant compressed to high pressure flows from the refrigerant compressor 12 when the shut-off valve A4 is open into the external heat exchanger 18. From there it flows to the high-pressure section of the internal heat exchanger 20 and the fully open expansion valve AE3. The refrigerant can flow to the expansion valve AE2 and into the interior evaporator 22 via a branching point Ab1 (evaporator section 22.1). In parallel or alternatively, the refrigerant can flow into the chiller 28 (chiller section 28.1) via a branching point Ab4 and the expansion valve AE1. From the evaporator 22 and/or the chiller 28, the refrigerant flows on the low-pressure side into the collector 24 and through the low-pressure section of the internal heat exchanger 20 back to the compressor 12.

In AC operation, the heating branch 16.1 or the secondary line 16 is shut off by means of the shut-off valve A3, so that hot refrigerant cannot flow through the heating register 26. To retrieve refrigerant from the inactive heating branch 16.1, the shut-off element A5, which is designed as a shut-off valve, can be opened so that the refrigerant can flow in the direction of the collector 24 via the shut-off element A5 and the check valve R2, with the shut-off element A2 being closed at the same time.

In heating operation of the refrigerant circuit 11, the shut-off valve A4 is closed and the shut-off valve A3 is open, so that hot refrigerant can flow into the heating branch 16.1.

To carry out the heating function by means of the chiller 28 to implement water heat pump operation, the refrigerant compressed by means of the refrigerant compressor 12 flows into the heating register 26 via the open shut-off valve A3. At the heating register 26, heat is emitted to a supply air flow L guided into the vehicle interior. The refrigerant then flows via the open shut-off valve A1 and the branching point Ab1. It is expanded by means of the expansion valve AE1 in the chiller 28 to absorb waste heat from electrical and/or electronic components arranged in a coolant circuit 28.2. With this heating function, the expansion valves AE3 and AE4 are closed, the shut-off valve A5 is closed, and the shut-off valve A2 is open. In this case, refrigerant displaced in water heat pump operation can be extracted via the shut-off valve A2 out of a bidirectional line 14.1 or the primary line 14 and supplied to the collector 24 via the check valve R2.

To carry out the heating function by means of the external heat exchanger 18 as a heat pump evaporator, the refrigerant compressed by means of the refrigerant compressor 12 flows via the open shut-off valve A3 to emit heat to a supply air flow L into the heating register 26. It is then expanded via the open shut-off valve A1 by means of the expansion valve AE3 in the external heat exchanger 18 to absorb heat from the ambient air. The refrigerant then flows via a heat pump return branch 15 to the collector 24 and back to the refrigerant compressor 12. The expansion valves AE1, AE2, and AE4 remain closed, as does the shut-off valve A5.

An indirect delta connection can be implemented in that when the shut-off valve A1 is open, the refrigerant compressed by the refrigerant compressor 12 is expanded by means of the expansion valve AE1 in the chiller 28, wherein no mass flow is generated at the same time on the coolant side, i.e., in the coolant circuit 28.2, thus, for example, the fluid used as the coolant, such as water or water-glycol mixture, remains on the coolant side of the chiller 28 or coolant does not actively flow through the chiller 28. The expansion valves AE2, AE3, and AE4 remain closed in this switching variant.

In a reheating or reheat operation, the supply air flow L supplied into the vehicle interior is first cooled by means of the evaporator 22 and thus dehumidified. Using the heat transferred to the refrigerant by evaporation and dehumidification and the heat supplied to the refrigerant via the compressor 12, the supply air flow L can be completely or at least partially reheated by means of the heating register 26.

For this purpose, the refrigeration system 10, in particular the air conditioning unit 32, has adjustable, in particular controllable and pivotable, temperature flaps 34 between the evaporator 22 and the heating register 26. In the example shown, a left and a right temperature flap 34L and 34R (shown schematically in FIG. 1) are arranged. The temperature flaps 34L, 34R can be adjusted or pivoted between an open position, designated as a 100% position, and a closed position, designated as a 0% position. Alternatively, it is also possible to connect the temperature flaps 34R, 34L downstream of the heating register 26.

In the 100% position, the entire supply air flow L flowing through the evaporator 22 is guided and heated via the heating register 26 before it can flow into the passenger compartment of the vehicle. In the 0% position the entire supply air flow L flowing through the evaporator 22 flows in the bypass around the heating register 26 without heating and thus without absorbing heat into the passenger compartment.

In an x position of the temperature flaps 34L and 34R with 0%<x<100%, these temperature flaps are only partially open, so that in each case only a partial air flow of the supply air flow L flowing through the evaporator 22 is guided via the heating register 26. This heated partial air flow can then be mixed with the remaining, cooled and dehumidified partial air flow. The supply air flow L heated in this way is supplied to the passenger compartment of the vehicle. As an example, a 50% position indicates that the temperature flaps 34R and 34L are only half open, i.e., 50%.

The refrigeration system 10 has a sensor device 36 in the secondary line 16 downstream of the secondary line valve A3 and upstream of the heating register 26, which is configured to detect a hot gas temperature value representing the temperature of the gaseous refrigerant upstream of the heating register 26. The hot gas temperature value can be measured or detected directly or also estimated indirectly based on other system parameters. For example, it is conceivable to determine a pressure in the secondary line 16 by means of the sensor device 36 and to draw conclusions about the hot gas temperature value therefrom. The sensor device 36 can, for example, be solely a temperature sensor or a combined temperature/pressure sensor.

The method proposed here builds on the above-described interconnection of the refrigeration system 10 when carrying out the heating function by means of the chiller 28 to implement a water heat pump operation. With this interconnection, refrigerant flows starting from the refrigerant compressor 12 into the secondary line 16 to the heating register 26 (further heat exchanger). The heating register 26 is used as a heat source for heating air L, which is then supplied to the interior of the motor vehicle. The refrigerant then flows via the open shut-off valve A1 and the open expansion valve AE1 to the chiller 28 (third heat exchanger). The refrigerant is then routed into the refrigerant collector 24 on the low-pressure side before it reaches the refrigerant compressor 12 again. In the heat pump operation considered here, the expansion valve AE2 is closed.

As already mentioned above, the refrigerant is expanded in the chiller 28 to absorb waste heat from electrical and/or electronic components arranged in a coolant circuit 28.2. The coolant, in particular a water-glycol mixture or cooling water, is used as a heat source in order to heat the coolant, in particular to evaporate it.

It has been shown that due to the efficiency of the electrical and/or electronic components used in the motor vehicle, particularly in this heating mode, sufficient waste heat cannot always be emitted to the coolant or cooling water, so that it is cooled too much in the chiller 28.

In order to counteract this excessive cooling of the coolant, various options for operating methods for the refrigeration system 10 are possible, which will be discussed below.

According to one embodiment of the method proposed here, the previously closed expansion valve AE3 can be opened at least partially or step-by-step, so that a partial mass flow of refrigerant is routed via the external heat exchanger 18, which then acts as an air heat pump evaporator. In other words, a partial mass flow of refrigerant flows through the chiller 28 and fluidically in parallel thereto through the external heat exchanger 18. When the external heat exchanger 18 is switched on, the shut-off valve A2 is opened so that the refrigerant can flow to the refrigerant collector 24 on the low-pressure side. The primary line valve A4 is closed. The two partial mass flows of refrigerant are combined again to form a total mass flow in the area of the branch Ab4 on the low-pressure side.

Alternatively, the step towards a total mass flow via the external heat exchanger 18 can be selected from the two partial mass flows via the chiller 28 and the external heat exchanger 18 and the air flow L can thus be heated solely via an air heat pump operation. The temperature level in the coolant flow can also be regenerated in this way, since there is no longer any heat absorption on the cooling circuit side.

At least one temperature sensor T6 is arranged in the coolant circuit 28.2 in order to detect the temperature of the coolant.

The switching on or connection of the external heat exchanger 18 as an air heat pump evaporator in addition to the chiller 28 as a water heat pump evaporator takes place in particular as a function of the coolant or cooling water temperature detected at the temperature sensor T6.

The refrigeration system 10 can also have at least one electrical heating element 40 which is configured to heat refrigerant as required. FIG. 1 shows by way of example electrical heating elements 40 at different positions of the refrigeration system 10 or the refrigerant circuit 11, wherein it is not required for several or all of the illustrated heating elements 40 to actually be implemented As is apparent from FIG. 1, an electrical heating element 40 can be provided in the route section between the refrigerant compressor 12 and the heating register 26, for example on the high-pressure side upstream of the heating register 26. Alternatively, a heating element 40 can be arranged downstream of the heating register 26 but upstream of the chiller 28. Furthermore, it is also possible for a heating element 40 to be arranged upstream of the refrigerant compressor 12. It is also conceivable for a heating element 40 to be assigned directly to the refrigerant compressor 12 or for a heating element 40 to be arranged in or also on the refrigerant compressor.

In the method presented here, such a heating element 40 can be activated or deactivated under certain conditions, which is described in more detail below.

The refrigeration system 10 can also have a bypass section 42 which branches off downstream of the heating register 26 (Ab6) and ends on the low-pressure side upstream of the refrigerant compressor 12 (Ab3 or Ab7). Such a bypass section 42 makes it possible to bypass the chiller 28 and the external heat exchanger 18 if necessary.

An expansion valve AE5 is provided in the bypass section 42 so that at least a partial mass flow of refrigerant can be routed through the bypass section 42 or the bypass section 42 can be blocked. If required, the expansion valve AE5 can be set in a corresponding open position or closed position in order to enable or block the desired mass flow of refrigerant through the bypass section 42.

If a bypass section 42 with an expansion valve AE5 is provided in the refrigeration system 10, a suction section 44 (between Ab3 and Ab8) can be replaced with the shut-off valve A5, because the bypass section 42 also allows refrigerant to be suctioned out of the secondary line 16 when it is inactive (in cooling or AC operation with the secondary line valve A3 closed).

Figure 2:
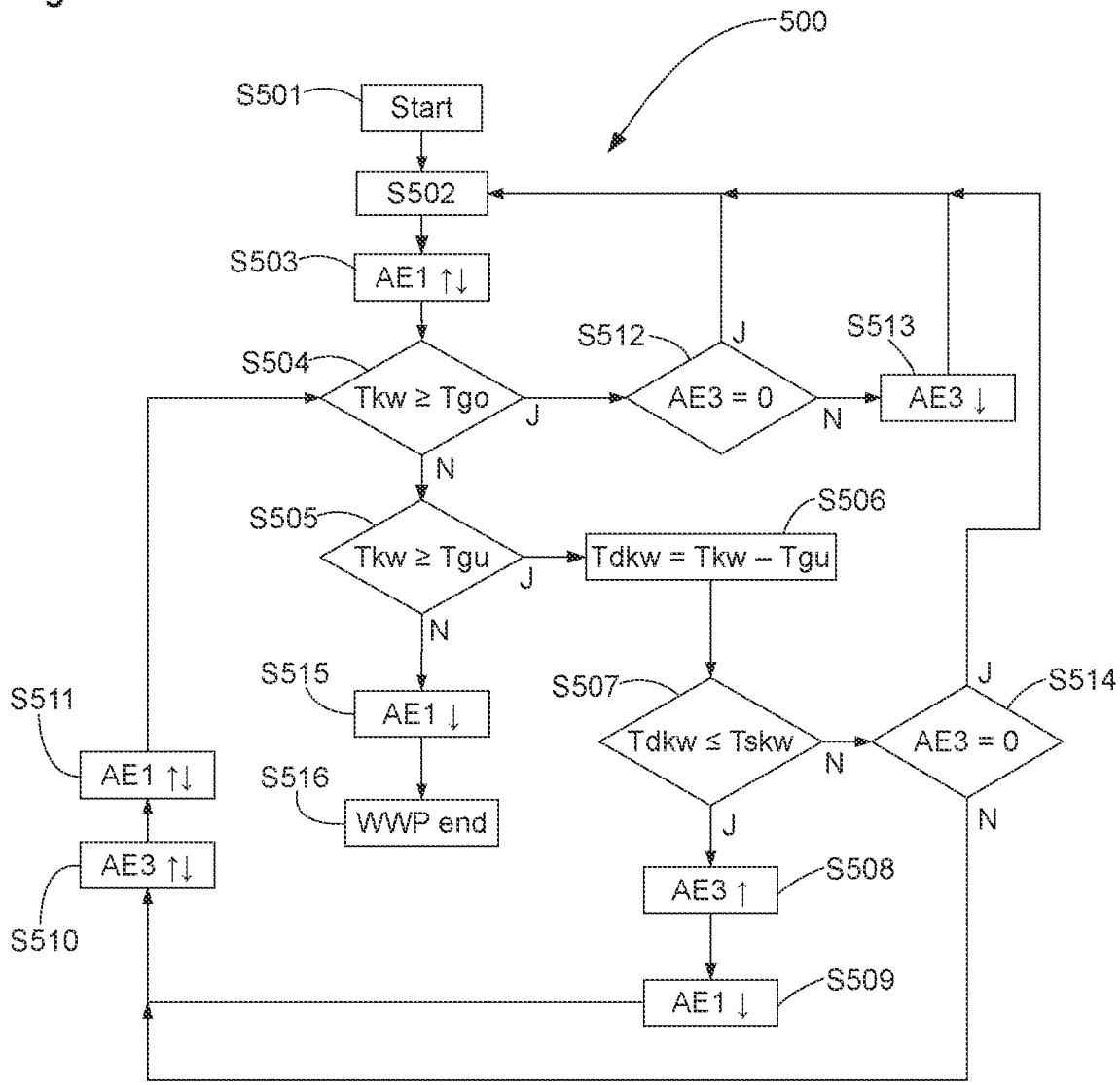
FIG. 2 shows a flow chart of an exemplary implementation of the method, in particular by means of the refrigeration system described in FIG. 1.

According to the method 500 shown in FIG. 2, after the start (S501) of the refrigeration system 10, a transition to heating or heat pump operation (S502) takes place at a time not specified here. Typically, the transition to S502 can be dependent on a measured outside temperature or a given heating requirement. For example, the operation according to S502 can be set at temperatures below 10° C., in particular 5° C. or less. The starting point for the following description of method 500 is the above-described interconnection, in which the total mass flow of refrigerant circulates from the refrigerant compressor 12 via the heating register 26 to the chiller 28 (water heat pump) and via the refrigerant collector 24 back to the refrigerant compressor 12.

According to a step S503, the expansion valve AE1 is adjusted to a suitable position, which is indicated by the two arrows pointing up and down. During the heating or heat pump operation considered here, the temperature of the coolant or cooling water in the coolant circuit 28.2 is regularly detected, for example by means of the temperature sensor T6.

The method steps of FIG. 2 described hereinafter can also be better understood by considering the diagram of FIG. 3, in which the described limiting values for the coolant temperature Tkw are illustrated qualitatively.

According to step S504, it is checked whether the coolant or cooling water temperature Tkw is greater than or equal to an upper temperature limiting value Tgo. If this is the case (J), the total mass flow of refrigerant continues to be routed only via the chiller 28, accompanied by a or the suitably adjusted position of the expansion valve AE1 (S503).

If the coolant temperature Tkw is below the upper temperature limiting value Tgo, it is checked in step S505 whether the coolant temperature Tkw is greater than or equal to a lower temperature limiting value Tgu. If the detected coolant temperature Tkw is greater than the temperature lower limiting value Tgu, the difference Tdkw between the coolant temperature Tkw and the temperature lower limiting value is calculated in step S506. According to step S507, it is checked whether the difference Tdkw falls below a threshold value Tskw, i.e., it is checked to what extent the coolant temperature Tkw has approached the lower limiting value Tgu. The threshold value Tskw can be 2 K, for example.

If the threshold value Tskw is reached or undershot, according to step S508, the expansion valve AE3, which is assigned to the external heat exchanger 18, is opened. As a result, a partial mass flow of refrigerant is routed via the external heat exchanger 18. Associated with this, according to step S509, the expansion valve AE1 is partially closed, which is assigned to the chiller, so that only a partial mass flow of refrigerant is still routed through the chiller 28 as well. Subsequent steps S510 and S511 indicate that the expansion valves AE1 and AE3 are switched to a regulated state in order to route the desired partial mass flows via the chiller 28 or the external heat exchanger 18. With regard to the control or regulation of the expansion valve AE3, it can be taken into consideration as a criterion that AE3 is set in such a way that the temperature of the refrigerant at the entry into the external heat exchanger 18 at most reaches the level of the ambient temperature or is slightly lower than this, for example 1 to 2 K lower than the ambient temperature.

The necessity of incorporating the external heat exchanger 18 as an air heat pump evaporator is checked based on steps S504 to S507. If the coolant temperature Tkw reaches the upper temperature limiting value Tgo (S504), it is checked in step S512 whether the expansion valve AE3 is (still) open. If it is still open, the expansion valve is closed in step S513. Then, according to step S503, the expansion valve AE1 is regulated to a suitable setting in order to route the total mass flow of refrigerant via the chiller 28 again.

If the coolant temperature Tkw does not reach the upper limiting value Tgo, but the difference Tdkw is greater than the threshold value Tsw (S507), a check is carried out in step S514 to determine whether the expansion valve AE3 is closed. If it is closed, if there is a difference Tdkw that is greater than the threshold value Tskw, wherein the upper temperature limiting value Tgo has not yet been reached, however, the sequence branches to step S503 and the total mass flow of refrigerant continues to be routed via the chiller 28 by appropriate regulation of the expansion valve AE1 (S503). If the expansion valve AE3 is open with a difference Tdkw that is greater than the threshold value Tskw, wherein the upper temperature limiting value Tgo has not yet been reached, however, the operation of the two heat pumps (chiller 28 and external heat exchanger 18) is maintained and the sequence branches to steps S510 and S511.

If the coolant temperature Tkw falls below the lower temperature limiting value Tgu (S505), which is to be avoided as much as possible using the method described here, the expansion valve AE1 can be closed according to step S515 and the water heat pump operation of the chiller 28 can be ended (S516). This is then followed by the transition to another mode of operation of the refrigeration system 10, for example the pure triangular process or air heat pump operation, which will not be discussed in detail here, however.

An operating method 500 has been described with reference to FIG. 2, in which the external heat exchanger 18 is used as an (air) heat pump evaporator for an air heat pump operation if the temperature Tkw of the coolant in the chiller 28 (third exchanger) is too low to be able to continue to ensure the water heat pump function with high performance.

Figure 4:
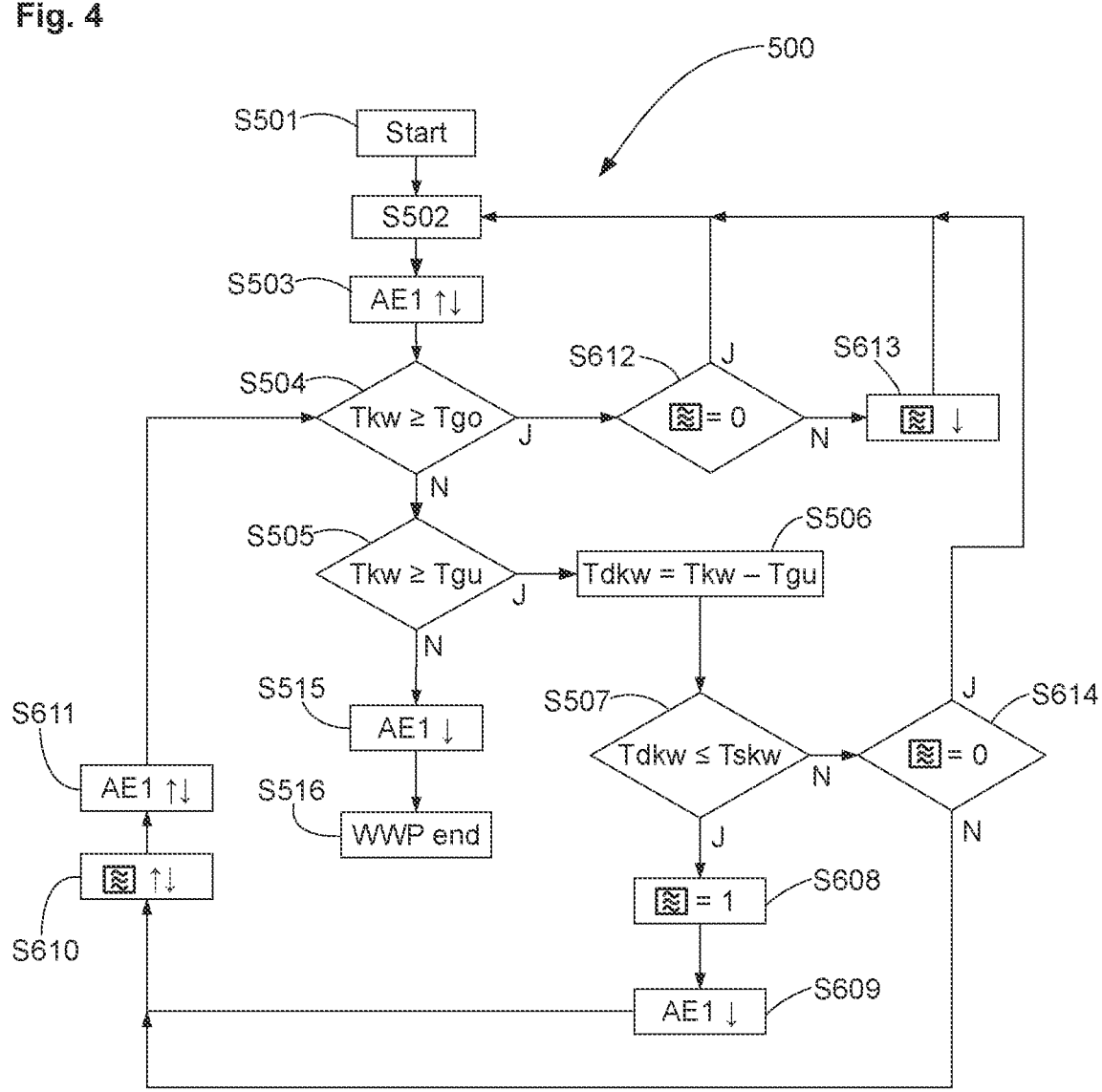
FIG. 4 shows a flow chart of an exemplary implementation of the method, in particular by means of the refrigeration system described in FIG. 1.

FIG. 4 shows in a schematic and simplified diagram alternative measures or method steps, using which the refrigerant in the refrigerant circuit can be heated when the coolant temperature Tkw at the chiller 28 falls, in order in particular to enable sufficient heating output for heating interior air.

Figure 3:
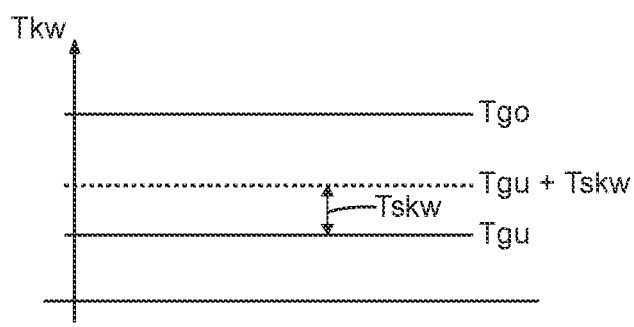
FIG. 3 shows a simplified diagram to illustrate limiting values of the coolant temperature.

With regard to steps S501 to S507, reference is made to the above description of FIGS. 2 and 3, which also applies to FIG. 4.

If, according to the check in step S507, the threshold value Tskw is reached or undershot, according to step S608, at least one electrical heating element 40 (FIG. 1) is activated, which is illustrated by the heating element symbol and "=1". As already explained with reference to FIG. 1, a heating element 40 can be arranged upstream or downstream of the third heat exchanger or chiller 28.

If at least one heating element 40 is activated according to step S608, according to step S609 the expansion valve AE1 assigned to the chiller 28 can be at least partially closed or adjusted to a suitable open position (S611). The at least one heating element 40 can also be set in a regulated, activated state according to step S610.

If the coolant temperature Tkw does not reach the upper limiting value Tgo, but the difference Tdkw is greater than the threshold value Tsw (S507), a check is carried out in step S614 to determine whether the heating element 40 is inactive. If it is inactive, if there is a difference Tdkw that is greater than the threshold value Tskw, wherein the upper temperature limiting value Tgo has not yet been reached, however, the sequence branches to step S502 and the total mass flow of refrigerant continues to be routed via the chiller 28 by appropriate regulation of the expansion valve AE1 (S503). If the heating element 40 is active at a difference Tdkw that is greater than the threshold value Tskw, wherein the upper temperature limiting value Tgo has not yet been reached, however, the operation of the heat pump (chiller 28) and the heating element 40 is maintained and the sequence branches to steps S610 and S611.

The necessity of activating the at least one heating element 40 is checked based on steps S504 to S507. If the coolant temperature Tkw reaches the upper temperature limiting value Tgo (S504), it is checked in step S612 whether the heating element 40 is (still) activated. If it is still activated, the heating element 40 is deactivated in step S613. The expansion valve AE1 is then regulated to a suitable setting according to step S503 in order to route the total mass flow of refrigerant via the chiller 28 again.

FIG. 5 shows in a schematic and simplified diagram alternative measures or method steps, using which the refrigerant in the refrigerant circuit can be heated when the coolant temperature Tkw at the chiller 28 falls, in order in particular to enable sufficient heating output for heating interior supply air.

With regard to steps S501 to S507, reference is made to the above description of FIGS. 2 and 3, which also applies to FIG. 5.

If the threshold value Tskw is reached or undershot, according to step S708, the expansion valve AE5, which is assigned to the bypass section 42, is opened. As a result, a partial mass flow of refrigerant is routed via the bypass section 42. Associated with this, according to step S709, the expansion valve AE1, which is assigned to the chiller, is partially closed, so that only a partial mass flow of refrigerant is still routed via the chiller 28 as well. Subsequent steps S710 and S711 indicate that the expansion valves AE1 and AE5 are switched to a regulated state in order to route the desired partial mass flows via the chiller 28 or the bypass section 42.

The necessity of incorporating the bypass section 42 is checked based on steps S504 to S507. If the coolant temperature Tkw reaches the upper temperature limiting value Tgo (S504), it is checked in step S712 whether the expansion valve AE5 is (still) open. If it is still open, the expansion valve is closed step-by-step in step S713. Then, according to step S503, the expansion valve AE1 is regulated to a suitable setting in order to route the total mass flow of refrigerant via the chiller 28 again.

If the coolant temperature Tkw does not reach the upper limiting value Tgo, but the difference Tdkw is greater than the threshold value Tsw (S507), a check is carried out in step S714 to determine whether the expansion valve AE5 is closed. If it is closed, if there is a difference Tdkw that is greater than the threshold value Tskw, wherein the upper temperature limiting value Tgo has not yet been reached, however, the sequence branches to step S503 and the total mass flow of refrigerant continues to be routed via the chiller 28 by appropriate regulation of the expansion valve AE1 (S503). If the expansion valve AE5 is open at a difference Tdkw that is greater than the threshold value Tskw, wherein the upper temperature limiting value Tgo has not yet been reached, however, the operation of the two heat pumps (chiller 28 and triangular process via the expansion element AE5) is maintained and the sequence branches to steps S710 and S711.

If the coolant temperature Tkw falls below the lower temperature limiting value Tgu (S505), which is to be avoided as much as possible using the method described here, the expansion valve AE1 can be closed according to step S515 and the water heat pump operation of the chiller 28 can be ended (S516). This is then followed by the transition to another mode of operation of the refrigeration system 10, for example the pure triangular process or air heat pump operation, which will not be discussed in detail here.

The temperature limiting values Tgu and Tgo used or taken into consideration during the above-described method 500 (FIGS. 2 to 5) can be specified as a function of a current ambient temperature and/or the relative humidity of the environment. For this purpose, it is conceivable that suitable temperature limiting values Tgu and Tgo are deposited or stored for corresponding ambient temperature values and/or relative humidity values, which can then be applied in the method. Another criterion for determining the temperature limiting values Tgu and Tgo can also be a temperature difference between the ambient temperature and the refrigerant temperature.

It is to be noted that the method steps described with reference to FIGS. 2 to 5 can optionally also be combined with one another, even if this has not been shown in a single (complex) diagram for reasons of clarity. For example, it is conceivable to combine steps of the method shown in FIG. 2 (incorporation of the external heat exchanger as an air heat pump) with the activation/deactivation of a heating element 40 (FIG. 4). Furthermore, for example, the activation/deactivation of a heating element 40 can be combined with the incorporation of the bypass section 42.

The invention claimed is:

1. A method for operating a refrigeration system having a heat pump function for a motor vehicle, wherein the refrigeration system comprises:
   a refrigerant compressor, which is connectable or connected to a primary line and a secondary line;
   a directly or indirectly acting external heat exchanger, which is arranged in the primary line;
   an evaporator, which is arranged in the primary line;
   at least one further heat exchanger representing a heat source which is arranged in the secondary line;
   a primary line valve arranged between the refrigerant compressor and the external heat exchanger;
   a secondary line valve arranged between the refrigerant compressor and the further heat exchanger representing a heat source;
   a third heat exchanger which operates as a water heat pump and acts directly or indirectly;
   wherein the method comprises the following steps:
   setting a heat pump operation in which the refrigerant is routed from the refrigerant compressor into the secondary line;
   setting an expansion valve assigned to the third heat exchanger such that a total mass flow of refrigerant flows through the third heat exchanger and is evaporated in the third heat exchanger by waste heat from coolant circulating in the third heat exchanger;
   detecting the temperature of the coolant in or at the third heat exchanger;
   wherein the total mass flow of refrigerant is routed through the third heat exchanger when the temperature of the coolant is greater than an upper limiting temperature,
   wherein an expansion valve assigned to the external heat exchanger is set in such a way that a partial mass flow flows through the external heat exchanger operating as an air heat pump, wherein at the same time the expansion valve assigned to the third heat exchanger is set in such a way that a partial mass flow of refrigerant continues to flow through the third heat exchanger.

2. The method as claimed in claim 1, wherein an expansion valve assigned to the external heat exchanger is at least partially opened as a function of a difference between the temperature of the coolant in the third heat exchanger and a lower limiting temperature if the difference is 2K or less.

3. The method as claimed in claim 2, wherein the flow of a partial mass flow of refrigerant through the external heat exchanger is maintained until the coolant temperature has reached the upper limiting temperature or is greater than the upper limiting temperature.

4. The method as claimed in claim 1, wherein the flow of a partial mass flow of refrigerant through the external heat exchanger is maintained until the coolant temperature has reached the upper limiting temperature or is greater than the upper limiting temperature.

5. The method as claimed in claim 1, wherein the upper limiting temperature and the lower limiting temperature are selected as a function of a detected ambient temperature.

6. The method as claimed in claim 1, wherein the upper limiting temperature and the lower limiting temperature are selected as a function of a detected relative humidity of the environment.

7. The method as claimed in claim 1, wherein the upper limiting temperature and the lower limiting temperature are selected as a function of a temperature difference possible in operation of the refrigeration system between the ambient temperature and the refrigerant temperature in the external heat ex-changer.

8. The method as claimed in claim 7, wherein the expansion valve assigned to the external heat exchanger is set in such a way that the refrigerant temperature at the entrance to the external heat exchanger is less than or equal to the ambient temperature.

9. The method as claimed in claim 1, wherein the expansion valve, which is assigned to the external heat exchanger, is closed as a function of the difference between the temperature of the coolant in the third heat exchanger and the lower limiting temperature.

10. The method as claimed in claim 1, wherein at least one electrical heating element is activated, as a function a difference between the temperature of the coolant in the third heat exchanger and a lower limiting temperature in order to supply heat to the refrigerant upstream or downstream of the third heat exchanger.

11. The method as claimed in claim 10, wherein the electric heating element is deactivated as a function of the difference between the temperature of the coolant in the third heat exchanger and the lower limiting temperature.

12. The method as claimed in claim 1, wherein, as a function of a difference between the temperature of the coolant in the third heat exchanger and a lower limiting temperature, at least a partial mass flow of refrigerant downstream of the further heat exchanger can be routed to the low-pressure side while bypassing the third heat exchanger and/or the external heat exchanger.

13. The method as claimed in claim 12, wherein bypassing of the third heat exchanger and/or the external heat exchanger for the rerouted mass flow of refrigerant is ended as a function of the difference between the temperature of the coolant in the third heat exchanger and the lower limiting temperature.

* * * * *